United States Patent
Hoernicke et al.

(10) Patent No.: US 9,471,044 B2
(45) Date of Patent: Oct. 18, 2016

(54) METHOD FOR DEBUGGING OF PROCESS OR MANUFACTURING PLANT SOLUTIONS COMPRISING MULTIPLE SUB-SYSTEMS

(71) Applicant: ABB Technology AG, Zurich (CH)

(72) Inventors: Mario Hoernicke, Landau (DE); Rainer Drath, Weinheim (DE); Ben Schroeter, Heidelberg (DE); Kurt Langer, Walldorf (DE); Jarkko Lalu, Espoo (FI)

(73) Assignee: ABB Schweiz AG, Baden (CH)

(*) Notice: Subject to any disclaimer, the term of this patent is extended or adjusted under 35 U.S.C. 154(b) by 713 days.

(21) Appl. No.: 13/781,229

(22) Filed: Feb. 28, 2013

(65) Prior Publication Data

US 2013/0218307 A1    Aug. 22, 2013

Related U.S. Application Data

(63) Continuation of application No. PCT/EP2010/005343, filed on Aug. 31, 2010.

(51) Int. Cl.
| | | |
|---|---|---|
| G05B 9/02 | (2006.01) | |
| G05B 17/02 | (2006.01) | |
| G05B 19/042 | (2006.01) | |
| G05B 19/05 | (2006.01) | |

(52) U.S. Cl.
CPC .............. *G05B 9/02* (2013.01); *G05B 17/02* (2013.01); *G05B 19/0426* (2013.01); *G05B 19/056* (2013.01); *G05B 2219/13037* (2013.01); *G05B 2219/13142* (2013.01); *G05B 2219/23283* (2013.01); *G05B 2219/33297* (2013.01)

(58) Field of Classification Search
USPC .................................. 700/81, 86; 702/83, 84
See application file for complete search history.

(56) References Cited

U.S. PATENT DOCUMENTS

| | | | | |
|---|---|---|---|---|
| RE31,247 E | * | 5/1983 | Johnstone | G05B 19/4063 700/169 |
| 4,607,256 A | * | 8/1986 | Henzel | G06F 11/2005 340/9.1 |
| 4,670,834 A | * | 6/1987 | Byal | G06F 8/71 700/81 |
| 4,852,047 A | * | 7/1989 | Lavallee | G05B 19/058 700/86 |
| 5,485,620 A | * | 1/1996 | Sadre | G05B 19/41865 700/18 |
| 6,044,305 A | * | 3/2000 | Larson | G05B 19/4184 700/11 |
| 6,556,950 B1 | * | 4/2003 | Schwenke | G05B 17/02 700/83 |
| 7,424,345 B2 | * | 9/2008 | Norbeck | F24F 11/0086 700/276 |

(Continued)

OTHER PUBLICATIONS

International Search Report (PCT/ISA/210) issued on May 11, 2011, by the European Patent Office as the International Searching Authority for International Application No. PCT/EP2010/005343.

*Primary Examiner* — Kidest Bahta
(74) *Attorney, Agent, or Firm* — Taft Stettinius & Hollister LLP

(57) ABSTRACT

An exemplary method and a system for debugging a control system of an industrial plant where the system includes at least two different control sub-systems, of the same or different control equipment type, on plant or sub-system level, and has specific programmable controller units in devices like PLCs, DCSs, robots, drives, instruments and/or other process specific components whereas all specified parameters and signals of the control system across its sub-systems, devices, and technologies are extracted and visualized on a single sight and are utilized for the definition of system wide breakpoints, utilizing a subset of those signals or parameters, and related conditions, e.g. logical combinations of the signals or parameters.

24 Claims, 3 Drawing Sheets

Basic control system architecture

(56) References Cited

U.S. PATENT DOCUMENTS

| | | | |
|---|---|---|---|
| 7,615,228 B2* | 11/2009 | Xia | A61K 39/12 424/184.1 |
| 2002/0054099 A1* | 5/2002 | Schmitt | G05B 19/056 715/762 |
| 2002/0120921 A1* | 8/2002 | Coburn | G05B 19/41885 717/140 |
| 2004/0036698 A1* | 2/2004 | Thurner | G05B 15/02 345/619 |
| 2006/0206860 A1* | 9/2006 | Dardinski | G05B 15/02 717/105 |
| 2008/0066004 A1* | 3/2008 | Blevins | G05B 19/0426 715/771 |
| 2008/0294275 A1* | 11/2008 | Reichard | G05B 19/042 700/88 |
| 2010/0074730 A1* | 3/2010 | Liang | F01D 11/005 415/173.4 |
| 2011/0202180 A1* | 8/2011 | Kowald | F24F 11/0009 700/276 |

\* cited by examiner

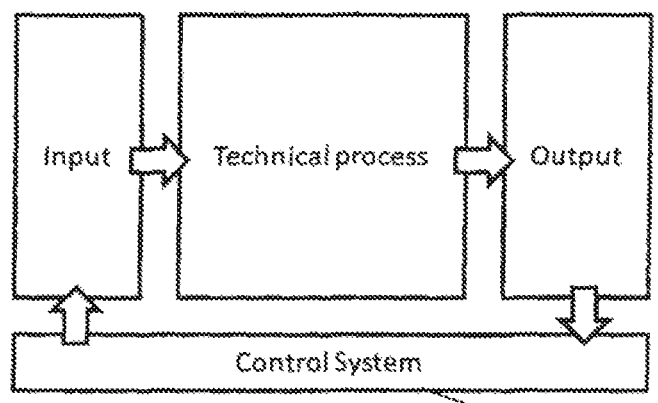
Fig. 1: Basic control system architecture

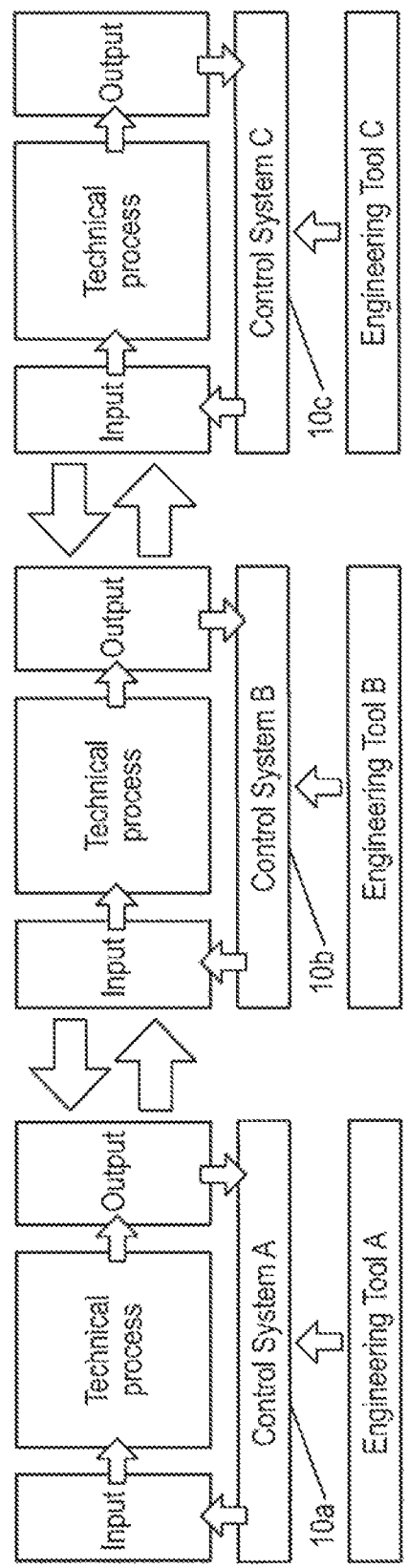
Fig. 2: Example of a distributed control system architecture

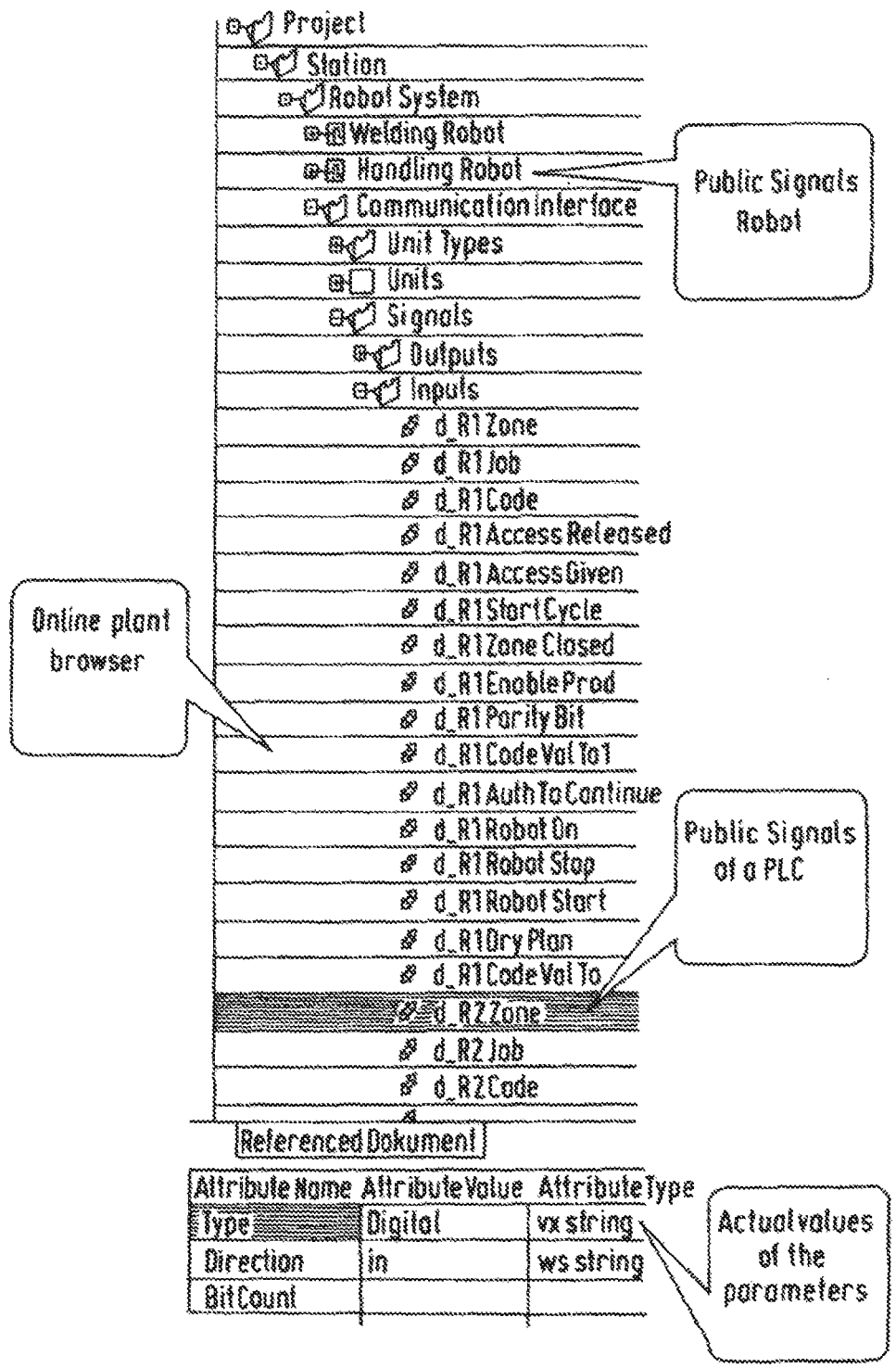
Fig.3: Plant wide signal tree across different control systems

METHOD FOR DEBUGGING OF PROCESS OR MANUFACTURING PLANT SOLUTIONS COMPRISING MULTIPLE SUB-SYSTEMS

RELATED APPLICATION(S)

This application is a continuation under 35 U.S.C. §120 of International Application PCT/EP2010/005343 filed on Aug. 31, 2010 and designating the U.S., the entire content of which is hereby incorporated by reference in its entirety.

FIELD

The disclosure relates to a method and system for debugging on a plant or sub-system level, such as debugging a control system including the corresponding process, e.g. a factory cell, a factory line, a process plant, a mechatronical unit, a machine or a complete plant.

BACKGROUND INFORMATION

Known control systems are largely used with the purpose of controlling industrial processes. However, there is no known system or method for debugging a complex control system across different control systems, different domains, different field buses, different field devices and different distributed control systems (DCS), programmable logic controller (PLC) or supervisory control and data acquisition (SCADA) systems, even in combination with plant simulators, device simulators or control simulators.

Known control systems are largely used for the purpose of controlling industrial processes. Using a control system, a technical process is influenced by means of actuators, whereas process parameters are measured by means of sensors. In this way, the control system retrieves knowledge about the technical process, calculates corresponding control actions, and influences the technical process actively.

FIG. 1 illustrates a scheme of basic control system architecture for a controlled technical process in accordance with a known implementation. The technical process as well as the control system should be engineered in order to fulfill the specified process behavior. Since industrial plants are rather complex and perform different industrial processes, the entire control system of FIG. 1 can be divided into sub-systems, which may include hardware and software components from different suppliers as shown in FIG. 2.

Due to this divided system structure the engineering is also divided in separate sub-system specific workflows supported by provider specific engineering tools. FIG. 2 depicts an example of the result of the subdivision process for the control system and engineering tool level, which for example may represent a robot, a conveyor and a cell PLC in the manufacturing domain, or a number of continuous sub-processes in the process domain.

The implementation and testing of control systems are usually done for each part of the system separately. The overall solution is tested and debugged earliest during the factory acceptance test (FAT hereafter) or even in the commissioning phase. Debugging is a process of stepwise execution of software with the possibility of a conditional stop depending on certain conditions. It is a common technique in the software development for PC applications as well as for robot, PLC or DCS control applications.

But since the engineering data is distributed to different engineering tools, there is no known method or system for a system wide debugging across different control sub-systems, which usually contain different types of control equipment. Once the process is started during FAT or commissioning, the sub-system specific engineering tools cannot proof conditions about parameters, signals, actuators or sensors, which are out of their scope.

Additionally, there is no known technical method or system known, which allows stopping control code execution of multiple control devices, which may be of different types of control equipment, neither in a virtual test environment nor in the real plant, at the same time in conjunction with the process including a number of devices which provide control functionalities. Resulting, it is hard to get test and debugging results at a glance.

At present there is no known method or system known which provides a single sight on all relevant process values and which allows the definition of break points or stop conditions across different control sub-systems, which may be of the same or different types of control equipment. For each engineering or application domain, a separate system is provided which has to be used. There does not exist a system having a single access point for all plant control sub-systems' signals, parameters, or other global variables.

Furthermore, in known implementations technical processes can be simulated in order to test the process and/or control behavior. Combinations with the control system and a simulated process are commonly used in order to verify the functionality of the control system. Although a simulation enables immediate halt of the process simulation, there is still no known method or system, which allows a control system wide debugging and halting across different sub-systems, neither using real hardware nor using virtual test beds or equipment emulators.

Known drawbacks of the state of the art are described in the following. As known, today's debugging of plant solutions during FAT and commissioning has a variety of drawbacks:

1. Testing and debugging of a control system composed of different sub-systems or even different types of sub-systems is not available.
2. Testing of the composed control system is an expensive time-consuming process in the FAT and commissioning phases of the engineering. Errors found in these phases can call for additional engineering work across sub-systems.
3. It is difficult to achieve correct functionality of the plant according to all specified test cases, because the engineer just sees the debugging and test results of a single sub-system.
4. The debugging of large technical processes can call for synchronized manual debugging in several engineering tools that are used to define the behavior of different types of control sub-systems responsible for different parts of the overall technical process. This task is very complicated, time consuming, error prone, and specifies the presence of several engineers responsible for different types of control equipment. There is no known method or system available to perform this within engineering tools.
5. Test results of all parts are not automatically assembled in one tool or document.
6. Consistent changes of parameters are hard to realize and have to be documented manually.
7. Impacts of changes in a sub-system to depending sub-systems are difficult to detect.

SUMMARY

An exemplary method for debugging the control system of an industrial plant or parts of the industrial plant is disclosed, the control system including at least two different control sub-systems, on a plant or sub-system level and having specific programmable controller units in devices like PLCs, DCSs, robots, drives, instruments and/or other process specific components, the method comprising: extracting all specified parameters and signals of the control system across its sub-systems, devices, and technologies; visualizing the extracted parameters on a single sight; utilizing the extracted parameters for a definition of system wide breakpoints; and utilizing a subset of those signals or parameters, and related conditions.

An exemplary system for debugging a plant or sub-system level of a control system, comprising: a processor configured to extract and visualize all specified parameters and signals of a plant control system for different application domains, wherein the application domains includes sub-systems and specific programmable controller units in devices and other process specific components.

DETAILED DESCRIPTION OF THE DRAWINGS

The attached drawing shows in

FIG. 1 illustrates a basic control system architecture in accordance with a known implementation;

FIG. 2 illustrates an example of distributed control system architecture in accordance with a known implementation; and FIG. 3 illustrates a plant wide signal tree across different control sub-systems in accordance with an exemplary embodiment of the present disclosure.

DETAILED DESCRIPTION

Exemplary embodiments of the present disclosure provide a plant debugger for the control system and the corresponding industrial process at hand, according to the initial part of the present disclosure which overcomes the mentioned issues and deficiencies and provides a domain independent plant debugger across multiple sub-systems and different sub-system types.

The plant debugger can start and stop multiple control systems and/or the corresponding process or simulation models of them from a single point of access in a synchronized and/or non-synchronized mode.

Hence, the exemplary embodiments characterized in that said plant debugger system, which can be a software tool or a device or a device running software, provides all available signals of all corresponding control sub-systems, of different or same control equipment types, within a single sight. This sight provides the signals to the user, which are publicly available during engineering, commissioning and FAT.

Furthermore said plant debugger can integrate functionality to control the underlying engineering tools of the sub control systems from a single point of access. This includes interrupting the control system and the technical process, restarting the process, freezing the process, or only freezing the public signal states, updating and tracking parameters in runtime/online and engineering/offline mode or showing differences between parameters and parameter values with different time stamps.

For this purpose related control and orchestration information about the underlying variety of sub-systems is specified for the plant debugger. The information can be retrieved by means of data interfaces to these control sub-systems and all related control and orchestration information is combined in a single common view.

Said plant debugger can also be used for "virtual plants"—simulation models of the plant or parts of it. This includes virtual control systems—simulations and/or emulation of the control system including its sub-systems. The prerequisite for debugging a virtual system is the availability of virtual controllers and/or simulators or emulators for other types of control equipment that provide the specified interfaces for data and signal exchange.

Said plant debugger provides functionality for the engineer to browse through the signals across different controllers and sub-systems and allows definition of "plant wide complex break points" (PWCBP). A break point is a known technology from the in software development, which allows stopping software on a certain line of code in combination with predefined conditions. A "plant wide complex break point" is a set of input or output variables (sensor and actuator signals or internal variables) across multiple control sub-systems in combination with programmable logical conditions. Once all items of a PWCBP fulfil predefined conditions, all underlying control engineering tools are forced to stop the control equipment and/or the virtual representation of those synchronously.

According to an exemplary embodiment of the present disclosure specified parameters and signals of a plant control system are extracted and visualized (e.g., via a processor) across different application domains consisting of sub-systems and comprising specific programmable devices like PLCs, robots, drives, instruments, and/or other process specific components, and the corresponding process being executed in, e.g. a factory cell, a factory line, a process plant, a mechatronical unit, or a machine.

According to another exemplary embodiment of the present disclosure all sub-system control signals are accessible from this single sight (e.g., via a processor). The common view is accessible for the test and/or commissioning engineer(s) and integrates debugging functionality for the entire plant solution, including all control sub-systems, whereas the whole process control system can be started or stopped for testing, debugging, and commissioning tasks from a single point of access according to given time based events, variable based events, parameter events, changes to parameters, changes to signals, or combinations of these.

According to an exemplary embodiment disclosed herein, said plant debugger (e.g., processor) allows definition of at least one breakpoint (PWCBP) including signals across the sub-systems and conditions.

According to yet another exemplary embodiment, the plant debugger stops the connected control system once a PWCBP-condition is fulfilled. The control system can be either the real control system controlling the real industrial process, or the virtual control system controlling a simulated industrial process. Hence, the control system can be systematically tested starting from the provided state valid at the plant break point.

According to another exemplary embodiment of the present disclosure, the plant debugger stops the corresponding real technical process at the same time as the control system. This is technically possible for many manufacturing processes, for example, in the area of discrete manufacturing.

In still another exemplary embodiment of this disclosure the plant debugger stops the corresponding plant simulator which represents the behaviour of the real technical process. This allows debugging of both the control system and the process simulation at the same time. This is possible for each kind of technical processes, even for complex physical or chemical processes.

In other exemplary embodiments of the present disclosure several different control systems can be started and stopped from a single point of access in a synchronized and/or non-synchronized mode.

According to an exemplary embodiment of the present disclosure, the state of concerning control systems is saved, which provides a capability to restore and restart a real system or a simulation of it from a certain point, e.g. for testing different strategies in a certain state or error. Thus, the exemplary embodiment can allow running a controlled technical process or a complete plant into a predefined state multiple times in order to proof correct functional behaviour or to simulate the behaviour in this state.

Another exemplary embodiment of the present disclosure provides changing any signal values and/or default signal values directly from the plant debugger, which is advantageously automatically documenting those changes.

In yet another exemplary embodiment disclosed herein changed signals, parameters, process parts, plant parts, domain parts or other related parts, and/or their impact are highlighted, whereas affected signals, parameters, process parts, plant parts, domain parts, states or other impacted parts are posted and highlighted to the user, e.g. in a display, and advantageously documenting the changes and the impact automatically by tracking online values and/or engineering changes.

Likewise an exemplary embodiment of the present disclosure provides that dependencies and/or links between signals or parameters are automatically gathered and visualized to the user by means of a color scheme or filter functionality.

Furthermore according to another exemplary embodiment disclosed herein separated plant parts as well as their dependencies and links and their application domains are visualized to the user whereas breakpoints are enabled according to application domain conditions, which interrupt multiple application domains together.

In another exemplary embodiment of the present disclosure plant parts are automatically locked for debugging and automatically unlocked after debugging.

Exemplary embodiments of the present disclosure provide that only those plant parts are affected by breakpoints—started and stopped—that are reserved by the user for debugging. Additionally, only the plant parts that are reserved for engineering are automatically locked for debugging and only those reserved parts are affected by breakpoints.

According to an exemplary embodiment states of the technical process as well as of the control system are read out continuously, e.g. by a circular or ring buffer that is continuously read and synchronized offline. The read values and states allow reconstructing the current situation in a real or simulated test environment, e.g. including a simulation of the process and the control system. Additionally, the buffer is automatically emptied when a certain condition is reached, or a previously buffered state is reached again where advantageously the state for restoring is not affected.

In another exemplary embodiment, the physical process can be driven automatically into a predefined state with minimal or no user interaction.

Based on the exemplary methods and systems disclosed herein complete plant solutions can be debugged from a single point of access and that the overall engineering costs including quality assuring tests are reduced, because the test and commissioning engineer finally is able to debug the plant or parts of it in its entirety.

Moreover, documentation of the tests can be done across application domains, with reduced or even without limitations whereas the impact of changes of the system can be easily discovered.

The exemplary embodiments provide further advantages in that the possibility of stopping the entire process from a single access point and that online values can be tracked and documented automatically whereas comparing of different control scenarios is easily and automatically possible.

Furthermore, the automated starting and stopping of debug sessions is possible by using event driven breakpoints whereas the debugging can be done for real systems and virtual systems using the same software tool.

Likewise, the restarting of the debugging session of a virtual control system at a PWCBP will reduce the time specified for the evaluation of different system behaviors.

In addition, the possibility of automating the testing of different system behaviors on a virtual control system allows a much more comprehensive testing without extra costs before starting the onsite commissioning.

These features and further exemplary embodiments are contained in the claims and shall be illustrated by means of an example in the figures attached to this specification.

FIG. 1 illustrates a basic control system architecture in accordance with a known implementation. The technical process as well as the control system should be engineered in order to fulfill the specified process behavior/specification. Since industrial plants are rather complex and perform different industrial processes, the whole control system of FIG. 1 is divided into sub-systems 10a, 10b, 10c which may consist of hardware and software components from different suppliers as shown in FIG. 2. FIG. 2 illustrates an example of distributed control system architecture in accordance with a known implementation.

Due to this divided system structure the engineering workflow is also divided in separate sub-system specific workflows supported by provider specific engineering tools.

In FIG. 2 an example of a distributed control system architecture as the result of the subdivision process on the control system and engineering tool level is being depicted, which for example may represent a robot, a conveyor and a cell PLC in the manufacturing domain, or a number of continuous sub-processes in the process domain.

The implementation and testing of control systems are usually done for each part of the system separately. The overall solution is tested and debugged earliest during the FAT and/or commissioning phase. Debugging is a process of stepwise execution of software with the possibility of a conditional stop depending on certain conditions. It is a common technique in the software development for PC applications as well as for robot, PLC or DCS control applications.

FIG. 3 illustrates a plant wide signal tree across different control sub-systems in accordance with an exemplary embodiment of the present disclosure. Namely, FIG. 3 depicts the invented plant wide debugging system, presenting a signal tree across different control sub-systems in a hierarchical view on the plant solution. Each relevant signal is visible to the engineer and available for debugging. For each signal, a list of parameters with online values is shown. As presented, process signal of different domains (PLC, robot etc.) are shown.

As an example, a factory cell is considered including a robot surrounded by a safety fence and a safety door. The control system of this factory cell includes three sub control systems: a cell PLC (Programmable Logic Controller), a robot controller and a safety PLC for the safety functions.

During the commissioning and test phase, the factory cell shall be tested if all components safely reach a safe state once the safety door is opened manually.

In accordance with the exemplary embodiment disclosed herein, the depicted signal tree allows determination of signals, which are part of the PWCBP: the signal of the safety door (door_open at the safety PLC) and the overall plant state (plant_running at the cell PLC) and the robot state (robot_inwork at the robot control). For each of these signals, the breakpoint conditions are defined (door_open=true AND plant_running=true AND robot_inwork=true). Once these three signals reach the defined conditions the control system stops.

According to a exemplary embodiment of the disclosure mentioned above, the connected control system, either the real control system controlling the real factory cell or the virtual control system controlling a cell simulation, stops at this point. Now, the control system can be systematically tested starting from the provided state being valid at the plant break point.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method for debugging a control system of an industrial plant or parts of the industrial plant, the control system including at least two different control sub-systems, on a plant or sub-system level and having specific programmable controller units in devices including at least one of PLCs, DCSs, robots, drives, instruments and process specific components, the method comprising:
   extracting, by at least one processor of a computing device of the control system, all specified parameters and signals of the control system across the sub-systems of the control system, the devices, and technologies of the control system;
   visualizing, by the at least one processor, the extracted parameters on a single sight;
   defining, by the at least one processor, system-wide breakpoints by utilizing the extracted parameters; and
   debugging, by the at least one processor, the control system by utilizing a subset of (i) at least one of the extracted signals of the control system and the extracted parameters of the control system, and (ii) conditions related to at least one of the extracted signals and the extracted parameters,
   wherein the visualizing of the extracted parameters comprises displaying all of the extracted parameters simultaneously on the single sight, and
   wherein the system-wide breakpoints are defined across all sub-systems of the control system.

2. The method according to claim 1, comprising:
   starting the control system or a simulation of the control system for testing;
   debugging and commissioning tasks from a single point of access according to at least one of the breakpoints, given time-based events, variable based events, parameter events, changes of parameters, changes of signals, and combinations thereof.

3. The method according to claim 1, comprising:
   starting or stopping the industrial process or a simulation of the control system for testing; and
   debugging and commissioning tasks from a single point of access according to at least one of the breakpoints, given time based events, variable based events, parameter events, changes of parameters, changes of signals, and combinations thereof.

4. The method according to claim 1, comprising:
   starting, stopping, freezing or restarting several different control systems at a single point of access in at least one of a synchronized mode and a non-synchronized mode.

5. The method according to claim 1, comprising:
   saving the state of related control systems for later restoration of the same state.

6. The method according to claim 1, comprising:
   changing signal values or default signal values directly by a plant debugger and automatically documenting the changed values.

7. The method according to claim 1, comprising:
   posting and highlighting at least one of changed signals, parameters, process parts, plant parts, domain parts other related parts, and their respective impacts are automatically documented in a display by tracking at least one of online values and engineering changes.

8. The method according to claim 1, comprising:
   gathering and displaying at least one of dependencies and links between at least one of the extracted signals and the extracted parameters, automatically, to a user utilizing at least one of a color scheme functionality and a filter functionality.

9. The method according to claim 1, comprising:
   visualizing separated plant parts as well as their dependencies and links and their application domains to the user whereas breakpoints are enabled according to application domain conditions, which also interrupt other application domains.

10. The method according to claim 1, comprising:
    locking plant parts automatically for debugging, and automatically unlocking the locked plant parts after debugging.

11. The method according to claim 10, comprising:
    automatically locking, for debugging, the plant parts being reserved for engineering, wherein only the reserved parts are affected by the breakpoints.

12. The method according to claim 1, comprising:
    reading out values and states of a technical process as well as of the control system continuously, in a circular or ring buffer, which is synchronized offline for at least one of later reconstruction of a selected state of the controlled system and a simulation of the selected state.

13. The method according to claim 12, comprising:
    emptying the buffer automatically when a certain condition is reached or a previously buffered state is reached again where the state for restoring is not affected.

14. The method according to claim 12, comprising:
    driving the technical process into a predefined state without user interaction.

15. A system for debugging a plant or sub-system level of a control system, comprising:
    a non-transitory computer-readable recording medium having computer-readable instructions recorded thereon; and
    a processor configured to, by executing the instructions recorded on the non-transitory computer-readable recording medium, extract and visualize all specified parameters and signals of a plant control system for different application domains together at the same time on a display component, wherein the application domains include sub-systems and specific programmable controller units in devices and other process specific components, and wherein the processor is configured to:

define system-wide breakpoints utilizing the extracted parameters; and debugging the control system by utilizing a subset of (i) at least one of the extracted signals of the control system and the extracted parameters of the control system, and (ii) conditions related to at least one of the extracted signals and the extracted parameters, wherein the system-wide breakpoints are defined across all sub-systems of the control system.

16. The system according to claim 15, wherein the processor is configured to start and stop the whole process control system for test, debugging and commissioning tasks from a single point of access, according to at least one of given time based events, variable based events, parameter events, changes to parameters, changes to signals, and combinations thereof.

17. The system according to claim 15 wherein the processor is configured to highlight at least one of changed signals, parameters, process parts, plant parts, domain parts and other related part, and automatically document a change impact by tracking at least one of online values and engineering changes.

18. The system according to claim 15, wherein the processor is configured to automatically gather at least one of dependencies and links between signals, parameters, and visualize them to a user by means of at least one of a color scheme functionality and a filter functionality.

19. The system according to claim 15, wherein the processor is configured to visualize separated plant parts, their dependencies and links, their application domains to a user, and enable breakpoints according to application domain conditions, which also interrupt other application domains.

20. The system according to claim 15, wherein the processor is configured to start and stop several different control systems from a single point of access in at least one of a synchronized mode and a non-synchronized mode.

21. The system according to claim 15, wherein the processor is configured to change any signal values directly from a plant debugger, without using system controls from the application domains and automatically documents those changes.

22. The system according to claim 15 wherein the processor is configured to change signal values directly from a plant debugger, without using engineering tools from the application domains and automatically documenting those changes.

23. The system according to claim 15, wherein the processor is configured to automatically lock plant parts for debugging and automatically unlock plant parts after debugging.

24. The system according to claim 23, wherein the processor is configured to drive a physical process into a predefined state without user interaction.

* * * * *